United States Patent [19]

Naidich et al.

[11] 4,024,675

[45] May 24, 1977

[54] METHOD OF PRODUCING AGGREGATED ABRASIVE GRAINS

[76] Inventors: Jury Vladimirovich Naidich, prospekt Vernadskogo, 85, kv. 48; Irina Alexandrovna Lavrinenko, ulitsa Krasnoarmeiskaya, 122, kv. 51; Vladimir Afanasievich Kondratsky, ulitsa Semashko, 8, kv. 16; Jury Nikolaevich Semenov, ulitsa Zhelyabova, 10, kv. 9; Boris Mikhailovich Emelyanov, ulitsa Kirova, 28/2, kv. 91; Leonid Pinkhusovich Kogosov, ulitsa Krasnopolskaya, 16, kv. 26, all of Kiev, U.S.S.R.

[22] Filed: Dec. 8, 1975

[21] Appl. No.: 638,690

Related U.S. Application Data

[63] Continuation of Ser. No. 469,748, May 14, 1974, abandoned.

[52] U.S. Cl. .................................. 51/296; 51/307; 51/309 R
[51] Int. Cl.² ....................... B24D 3/06; B24D 3/10
[58] Field of Search ............ 51/295, 293, 309, 296, 51/307

[56] References Cited

UNITED STATES PATENTS

| 2,194,472 | 3/1940 | Jackson | 51/298.1 |
| 2,216,728 | 10/1940 | Benner et al. | 51/295 |
| 2,495,257 | 1/1950 | Hunter | 51/309 |

FOREIGN PATENTS OR APPLICATIONS

| 1,247,764 | 9/1971 | United Kingdom | 51/298 |
| 491,659 | 9/1938 | United Kingdom | 51/298 |

Primary Examiner—Donald J. Arnold
Attorney, Agent, or Firm—J. Harold Nissen

[57] ABSTRACT

A method of producing aggregated abrasive grains for cutting tools and the like, comprising sintering a mixture of abrasive material powders and metal or alloy powders together with 5 to 10% by weight of the metal powders of an adhesion-active agent, to obtain a cake which is subsequently crushed. The sintering takes place in a loose state so that the cake has a porous structure which by crushing forms aggregated abrasive grains which break along the voids.

1 Claim, 1 Drawing Figure

U.S. Patent  May 24, 1977  4,024,675
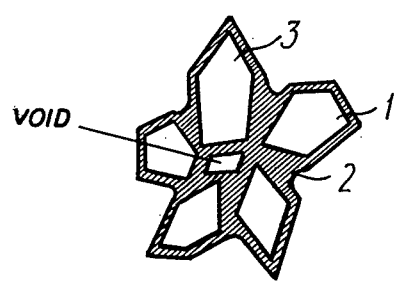

METHOD OF PRODUCING AGGREGATED ABRASIVE GRAINS

This is a continuation of applicants' application Ser. No. 469,748, filed May 14, 1974 with the same title, now abandoned.

The present invention relates to super-hard artificial materials and more particularly to a method of producing aggregated abrasive grains.

Aggregated grains are essentially a complex of two or more elementary grains of abrasive material bound by means of another material termed binder material. Various materials, in particular metals and alloys thereof, as well as glass can be used as the binder material, metals and alloys ensuring stronger cohesion and hence being more practical as compared to glass.

Aggregated grains are used in the manufacture of various cutting tools (for example, polishing and abrasive disks, etc.) intended for the working of hard materials.

The present invention is directed at improving aggregated grains with a metal binder.

Known in the art is a method of producing aggregated diamond grains wherein a mixture of a diamond powder and a powder of a metal, in particular nickel, copper, cobalt or alloys thereof, wherein as a rule copper is the main component, is subjected to pressing followed by sintering, the proportion of diamond and metal powders ensuring proper filling of the space between the diamond particles. The sintered cake thus produced is a solid abrasive body which is further crushed upon cooling to produce aggregated diamond grains (cf. British Pat. No. 491,659).

The main disadvantage of the above-described prior art method is in that the aggregated grains thus obtained are characterized by a compact equiaxial shape, which fact tends to impair their proper lodging in the matrix of a tool, especially so in case of an organic matrix. Another important disadvantage of the above-described method is the insufficient strength of an aggregated grain, which is due to poor adhesion of abrasive grains, in particular diamond grains, to the metal, resulting in rapid disintegration of an aggregated grain into elementary grains in the course of operation.

Also known in the art is a method of producing aggregated diamond grains by hot pressing a mixture of diamond and nickel powders (cf. British Pat. No. C1.C4V, No.1,247,764). The disadvantages of the former method are inherent in the latter method as well.

There is also known in the art a method of producing aggregated diamond grains by effecting galvanic coating of elementary diamond grains with a layer of metal, usually copper or nickel; aggregated grains are produced, provided a sufficient amount of metal is applied to coat the abrasive grains (cf. British Pat. Cl.C4V No.1,247,764). The above disadvantages are common to all these methods.

It is an object of the present invention to provide a method which eliminates the above disadvantages.

The principal object of the present invention is to provide a method of producing aggregated abrasive grains which ensures the production of aggregates having a developed surface to ensure proper holding of aggregated grains in the matrix of a tool and consequently increase the service life of the abrasive instrument where aggregate abrasive grains are used. Another object of the invention is to improve the strength of the aggregated grain due to the formation of a film fused to the surface of the elementary abrasive grains.

A practical object of the present invention is to produce an abrasive cake having a porous structure.

This is achieved in a method of producing aggregated abrasive grains wherein a mixture of abrasive and metal powders is sintered in the presence of a liquid phase and the cake thus produced is subjected to crushing, wherein according to the invention the mixture of powdered materials to be sintered is in a loose or unbound bulk state. The required degree of wettability of elementary grains with metal is achieved and the cohesion of individual elementary grains to each other is improved by effecting the sintering operation in the presence of an additive, which is titanium and/or zirconium, and/or chromium, and/or vanadium, and/or silicon. Owing to the sintered powders being in a loose bulk state and the resulting pore formation, the above additives, when introduced into the mixture, form a thin film on the surface of the abrasive particles, said film being chemically bound to the surface thereof and is conducive to the curing of various defects on the surface of abrasive grains, thus improving the strength of the elementary grains 1.5 to 2-fold and strongly binding the grains to each other.

Specifically, the additive is introduced in amounts of 5 to 10 weight percent of the basic metal powder.

A better understanding of the present invention will be had from the following detailed description thereof taken in conjunction with specific examples of the method, including the characteristics of the aggregated abrasive grains thus produced. Particularly when viewed in the light of the drawing the sole figure of which is a schematic representation of an enlarged aggregated abrasive grain produced by the method according to the present invention.

It should be noted that the particle size distribution of the abrasive powder bears no import to the method of the present invention, provided it is within the range conventionally adopted in the prior art processes. The binder metal may be represented by various metals and alloys thereof, for example copper, tin, nickel, cobalt, iron, etc., as well as copper/silver alloys, copper/tin alloys, etc.

The use of the above-mentioned metals and alloys for the production of aggregated abrasive grains involving the sintering method is quite familiar per se to those skilled in the art; consequently we omit a disclosure of the components of the alloys used in putting the method into practice, inasmuch as the method involves no alloys other than those already known in the art.

In reducing our method to practice, the abrasive powder and a metal powder can be mixed in the same proportions as generally used for similar methods.

The preferred proportion is within the range of from 4:1 to 1:5 by volume, for the abrasive powder and the metal powder respectively.

The most preferred proportion for effecting the method of the present invention is within the range of from 4:1 to 1:1.5.

The binder metal or alloy is conventionally selected depending on the nature of the abrasive material.

The selection of proper binder metal will be illustrated in the Examples given hereinbelow.

The abrasive and metal powders are preferably sintered in the presence of such additives as titanium, zirconium, chromium, vanadium. The additive and the amount thereof is selected depending on the nature of the abrasive material. Thus, for example, a preferred additive in case of diamond powder is titanium, whereas a zirconium additive is preferred for a mixture of diamond and boron carbide powders.

The selection of additives depending on the type of an abrasive powder is illustrated in the Examples given below. In practice, only one additive is required, a combination thereof yielding no substantially positive effect. The additives in the form of a powder are generally introduced into the binder metal powder prior to mixing the latter with the abrasive powder, however the additive can also be introduced after the binder metal powder has been mixed with the abrasive powder. The recommendable amount of additive is 5 to 10 percent in excess of 100 percent by weight of the binder powdered metal, which is the basic metal powder. A mixture of powders prepared by any procedure desired is subjected to sintering in a loose bulk state, in a protective medium or under vacuum at a temperature ensuring the melting of the binder metal, i.e. the process of sintering is carried out in the presence of a liquid phase of the binder metal. The temperature of sintering in known to be dependent on the nature of the binder metal and the abrasive material, generally being in the range of from 800 to 1200° C.

During the process of sintering, the temperature is maintained at the required level until the binder metal is completely melted. The cake thus produced features a porous structure. Upon cooling in vacuum the cake is crushed in the open air, using conventional crashing means, to produce aggregated grains comprised of elementary abrasive grains 1, bound together by metal 2. The aggregated grains produced by the method according to the present invention have a strongly developed surface as shown in the accompanying drawing. The developed surface of abrasive grains produced by the method according to the present invention is a direct result of the porous structure of the cake. The pore formation in the sintered powder mass, especially in the presence of the above stated titanium, zirconium, chromium silicon and vanadium additives, is conducive to the formation of thin films 3 on the surface of the abrasive grains, the films being securely fused to the surface of the elementary abrasive grain 1.

This feature tends to strengthen the elementary grains proper which form an aggregated grain, as well as their mutual cohesion which correspondingly increases the strength of an aggregated grain at least 1.5-fold. As a result of a substantially developed surface, the aggregated grains produced by the method of the present invention are secured in the matrix of a tool considerably better than the prior-art aggregated grains having a compact surface. The improved strength of the aggregated grains proper, together with the improved embedding thereof in the matrix of a tool has a beneficial effect on the service life of the tool with the aggregated abrasive grains.

EXAMPLE 1

A diamond powder having a particle size of 100 to 80 microns and a powdered alloy comprising 72 weight percent of silver, and 28 weight percent of copper were used for sintering. The diamond powder and the alloy powder were taken in the proportion of 3 to 1, respectively. The sintering was carried out in the presence of a titanium additive in an amount of 7 weight percent in excess of the 100 weight percent of the basic metal powder, at a temperature of 900° C under vacuum. The aggregate grains obtained after crushing the cake are characterized by a strongly developed structure and strong adhesion of the primary (elementary) grains to each other. The grains thus produced were used for the manufacture of grinding disks on an organic binder and subjected to testing by way of grinding hard alloys. The test were carried out at a disk speed of 25 m/sec and longitudinal feed of 2 m/min and cross-feed of 0.2 mm per double pass. Specific diamond consumption was 0.06 to 0.08 mg/g.

EXAMPLE 2

An abrasive mixture comprised of 60 percent of diamond powder and 40 percent of boron carbide and a powdered alloy comprised of 80 percent of copper and 20 percent of tin was used for sintering.

The abrasive powder and the powdered alloy were taken in the ratio of 1.5 to 1 respectively. The sintering was carried out in the presence of a titanium additive in an amount of 10 weight percent in excess of 100 percent of the weight of the basic metal powder, at a temperature of 1000° C under vacuum.

The aggregate grains thus produced were characterized by a developed structure and strong binding of the primary (elementary) grains to each other.

The grinding disks on an organic binder, manufactured using these aggregated grains were tested in sharpening multi-cutter hard-alloy tools, the hard-alloy and the steel portions of the tool being machines simultaneously. The disk speed was 20–30 m/sec; longitudinal feed, 2 m/min; cross-feed, 0.04 mm/double pass. Specific diamond consumption was about 0.5 mg/g.

EXAMPLE 3

An abrasive powder of cubic beron nitride having a grain size in the range of 125 to 100 microns, and a powdered alloy comprised of 80 percent copper and 20 percent tin were used for sintering. The ratio of the abrasive powder and the alloy powder was 1.2 to 1, respectively.

The sintering was carried out in the presence of a zirconium additive in an amount of 10 percent in excess of 100 percent of the weight of the basic metal powder, at a temperature of 1050° C, under vacuum not lower than $2.10^{-5}$ mm Hg, for a period of 25 minutes.

The aggregated grains thus produced are characterized by a developed surface and high strength. The grains were used for the manufacture of grinding wheels on an organic binder. The grinding wheels were tested in machining specimens of steel having 0.7 to 0.95 carbon content, at a wheel speed of 30 m/sec; longitudinal feed of 1 m/min and crossfeed of 0.02 mm/double pass, the specific consumption of cubic boron nitride being 0.2 to 0.26 mg/g.

EXAMPLE 4

A mixture of abrasive powders was formed comprised of 70 percent of cubic boron nitride having a grain size in the range of 125 to 100 microns and 30 percent of electrocorundum having a grain size in the range of 100 to 80 microns, and a powdered alloy comprised of 95 percent copper and 5 percent nickel.

The ratio of the abrasive and metal powders was 1 to 1. The sintering process was carried out in the presence of a chromium additive in an amount of 6 percent in excess of 100 percent of the weight of the basic metal powder, at a temperature of 1200° C, under vacuum, for a period of 30 minutes.

The aggregated grains obtained by crushing the cake had a developed surface and featured strong mutual adhesion of the grains. The aggregated grains were used for the manufacture of grinding wheels on an organic binder.

The grinding wheels were tested by machining specimens of hard steel having 0.7 to 0.95 carbon content. The wheel speed was 20 to 30 m/sec. longitudinal feed, 2 m/min, and cross-feed, 0.03 mm/double pass. The specific consumption of diamonds in machining the specimens was about 0.4 mg/g.

EXAMPLE 5

A mixture of 75 percent of a diamond powder having a grain size in the range of 160 to 125 microns and 25 percent of powdered boron carbide having a grain size of 100 to 80 microns, was sintered with a copper powder, the ratio of the abrasive powder and the metal powder being 1 to 1.

The process of sintering was carried out in the presence of a silicon additive in an amount of 10 percent in excess of 100 percent of the weight of the basic metal powder, at a temperature of 1000° C, under vacuum, for a period of 40 minutes. The aggregated grains thus produced were characterized by a developed surface and strong adhesion of the elementary grains to each other.

The aggregated grains were used for the manufacture of grinding wheels on an organic binder.

The grinding wheels were tested by machining specimens of a hard alloy together with steel having 0.4 to 0.5 carbon content.

The grinding wheel speed was 25 m/sec, longitudinal feed, 1 m/min, cross-feed, 0.02 mm/double pass.

The specific consumption of diamonds in machining the specimens was about 0.3 mg/g.

EXAMPLE 6

A mixture of abrasive powders comprised of 60 percent diamond powder having a grains size in the range of 100 to 80 microns and 40 percent of silicon carbide powder having a grain size in the range of 63 to 50 microns was sintered with a powdered alloy of 90 percent copper and 10 percent nickel. The ratio of the abrasive powder to the metal powder was 1 to 1.2, respectively.

The sintering process was carried out in the presence of a vanadium additive in an amount of 8 percent, at a temperature of 1200° C, under vacuum of $1 - 2.10^{-5}$ mm Hg, for a period of 30 minutes.

The aggregated grains thus produced were characterized by a devel ped surface and high strength; they were used for the manufacture of grinding wheels on an organic binder.

The aggregated grains may be also used independently in the function of a basis abrasive material.

The grinding wheels were tested in machining hard steel specimens having 0.7 to 0.95 percent carbon content. The wheel speed was 30 m/sec, longitudinal feed, 1 m/min, and cross-feed, 0.04 mm/double pass. The specific consumption of diamonds was 0.6 mg/g.

What is claimed is:

1. In a method of producing aggregated abrasive grains in which a mixture of abrasive powders and metal powders is sintered to produce a cake which is crushed to form the abrasive grains, the improvement comprising the steps of: adding an adhesion-active agent to the mixture, the agent being selected from the group consisting of titanium, zirconium, chromium, vanadium and silicon; maintaining the mixture in a loose bulk state during the sintering step; and effecting the sintering at a temperature of between 800 and 1200° C, sufficient to melt the metal powders, so that the produced cake is porous; wherein the abrasive powders are selected from the group consisting of diamond, cubic boron-nitride, boron-carbide, silicon-carbide and aluminum-oxide powders; the metal powders being selected from the group consisting of copper, tin, nickel, cobalt, iron, silver, and alloys thereof; the ratio of the abrasive powders to the metal powders being between 4:1 and 1:1.5 by weight; and the adhesion-active agent being added to and present in an amount between 5 and 10% by weight of the metal powders.

* * * * *